April 16, 1935. W. D. VAN DYKE Re. 19,541
APPARATUS FOR TUFTING FABRICS
Original Filed March 7, 1931 2 Sheets-Sheet 1
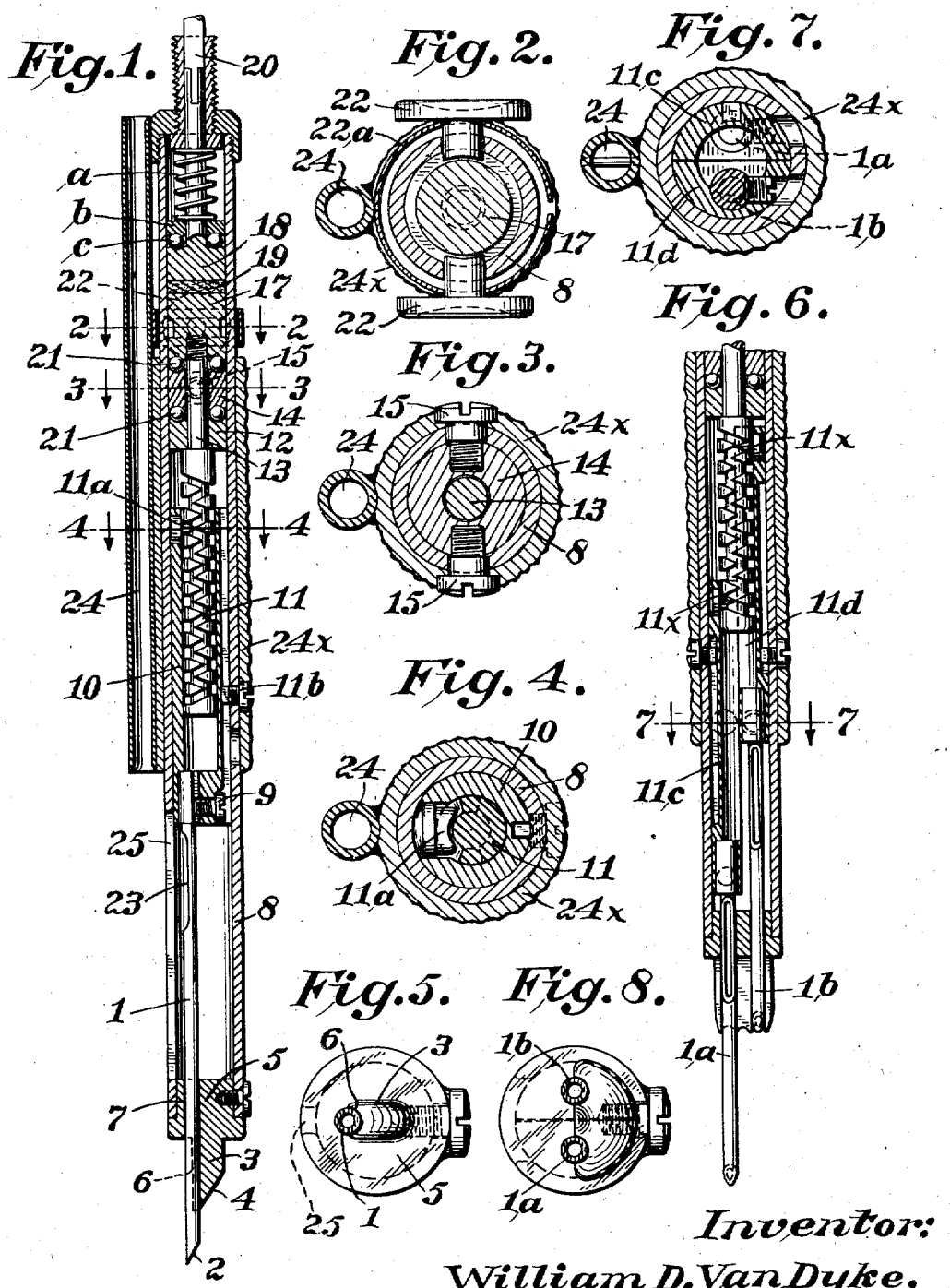
Inventor:
William D. Van Dyke,
By Spear, Duckworth & Hale
Attys.

April 16, 1935. W. D. VAN DYKE Re. 19,541

APPARATUS FOR TUFTING FABRICS

Original Filed March 7, 1931 2 Sheets-Sheet 2

Inventor:
William D. Van Dyke,
By Spear, Dwarsh & Hall
Attys.

Reissued Apr. 16, 1935

Re. 19,541

UNITED STATES PATENT OFFICE 19,541

APPARATUS FOR TUFTING FABRICS

William D. Van Dyke, Chattanooga, Tenn., assignor to Van Dyke Textigraph Corp., Chattanooga, Tenn., a corporation of Tennessee Original No. 1,888,941, dated November 22, 1932, Serial No. 520,877, March 7, 1931. Application for reissue October 24, 1934, Serial No. 749,867

27 Claims. (Cl. 112—80)

One object of the invention is to provide apparatus, driven by power, under high speed, which will be self-feeding in the sense that the tool, which applies the tufts or embroidery to the fabric, will advance along the fabric automatically as the tufting is applied thereto.

A further object of the invention is to provide a form of tool which will control the inserted loop from the upper side of the fabric, that is, the side upon which the tool is located, to prevent the last inserted loop or tuft from being withdrawn as the needle penetrates the fabric on a new stroke.

A further object of the invention is to provide driving means in the handle of the tool of compact and simple form, whereby the said driving mechanism is enclosed within the casing, which affords a comfortable and proper size of handle for directing the tool over the surface of the fabric.

The invention is shown in the accompanying drawings, in which:

Figure 1 is a longitudinal sectional view of the tool;

Figure 2 is a transverse section of Figure 1 on line 2—2;

Figure 3 is a cross-section on line 3—3 of Figure 1;

Figure 4 is a cross-section on line 4—4 of Figure 1;

Figure 5 is a bottom plan view of the lower end of the implement;

Figure 6 is a longitudinal sectional view of a modification in which two needles are employed;

Figure 7 is a cross-sectional view of Figure 6 on line 7—7;

Figure 8 is a bottom plan view of Figure 6;

Figure 9:
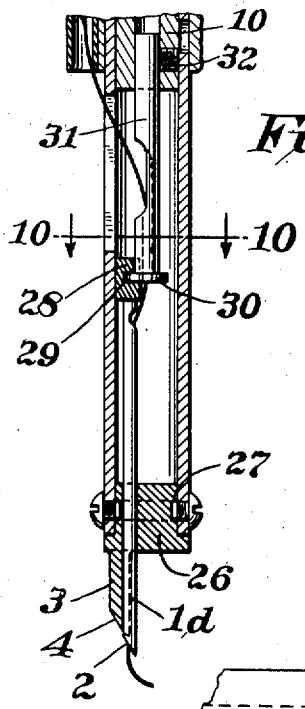
Figure 9 is a longitudinal section of a further form of the invention in which the needle holder is swiveled to permit curved lines of embroidery or tufting to be made on the fabric.
Figure 10:
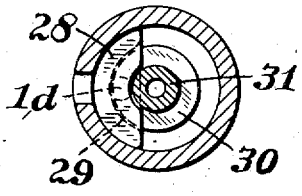
Figure 10 is a cross-sectional view of Figure 9 on line 10—10.
Figure 10A:
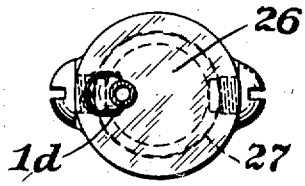
Figure 11:
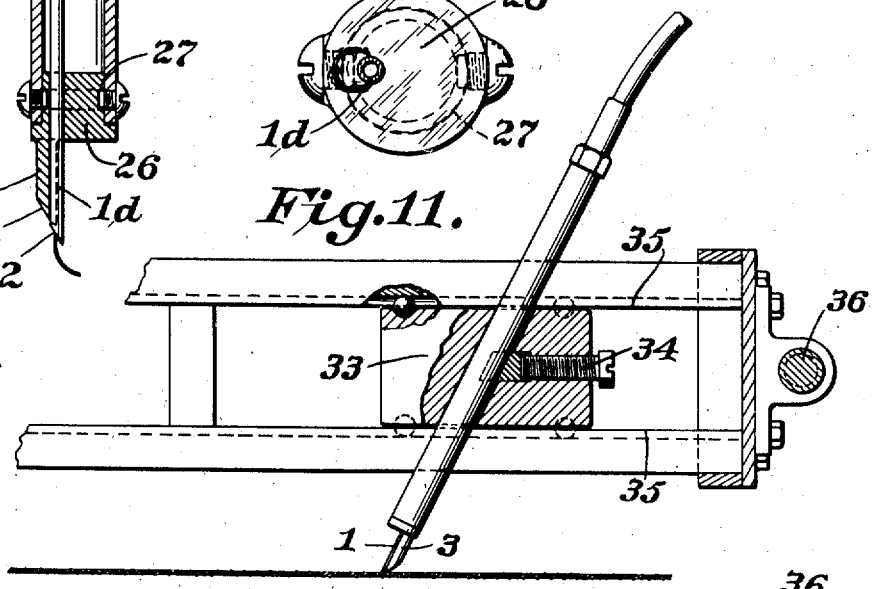
Figure 12:
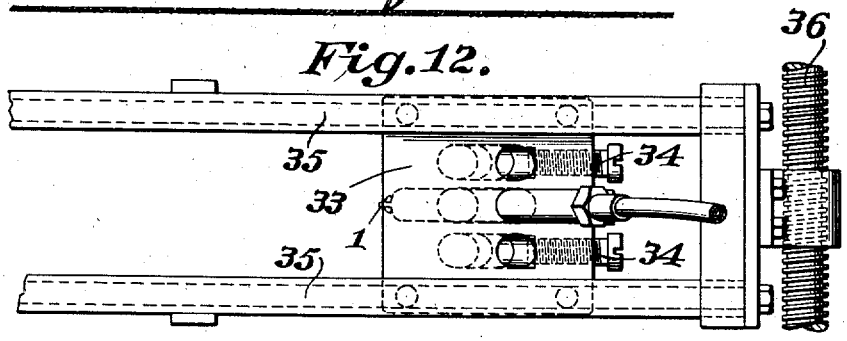

Figure 10*a* is a bottom view of Figure 9;

Figure 11 shows a mounting for the implement which guides it as it automatically traverses the fabric as a result of the operation of the needle; and Figure 12 is a plan view of Figure 11.

In these drawings, 1 is a hollow needle having its ends beveled at 2, this bevel being on the rear side of the needle in relation to the direction in which the tool traverses the fabric during the operation of the apparatus. This needle has directly juxtaposed thereto a presser foot 3 which is also inclined or beveled toward its rear side, as indicated at 4. The block 5, which carries this presser foot has a groove at 6, on its front side in which the needle 1 lies, and the enlarged portion of the block has an opening at 7 through which the elongated hollow needle is guided.

The block 5 is fixed within the lower end of the casing 8, which is of substantially cylindrical form, encloses a driving mechanism and serves as a handle by which the tool may be directed over the fabric to be tufted or embroidered. The needle at its upper end is attached by a pin or screw 9 to the lower end of a sleeve 10 of a diameter to fit the interior diameter of the case 8 so as to be guided thereby. This sleeve has within it a double screw-threaded member 11, the exterior diameter of which is substantially that of the interior diameter of the sleeve. This double screw member is small in diameter, and consequently the diameter of the sleeve and that of the outer casing are kept within limits to provide a tool of elongated character, and of comparatively small diameter to be comfortably held in the hand substantially no larger than that of a fountain pen. The double screw member converts rotary motion, which is applied thereto, into reciprocating motion in the sleeve 10 and the needle 1, and the arrangement of parts involved in this translation of the rotary motion of the motor into reciprocating motion of the needle is such that a compact form of tool is provided, and this driving mechanism is immediately adjacent the needle so that a positive drive is imparted thereto, and the stroke of the needle is maintained without variation.

The sleeve has a stud 11*a* which engages the screw by which the sleeve is reciprocated.

The sleeve has a longitudinal groove into which a screw 11*b* extends which holds the sleeve against rotation while guiding it in its reciprocating movement.

The upper end of the screw member 11 is provided with a collar 12, on a stem 13 passing through a bearing block 14, fixed by a screw 15 to the casing and within the same, and this shaft member or stem 13 is attached at its upper end to one member 17 of a friction clutch. The other member of this friction clutch 18 is faced with a disc of leather 19 so as to impart motion to the member 17 and thus to the screw member when the member 18 is rotated. This member 18 is connected in any suitable way with the flexible shaft at 20, extending back to the electric motor, whereby rotary motion is imparted to the clutch members, as above described. Anti-friction balls 21 are arranged at the point shown to provide a thrust bearing. The drive may be controlled by a button or buttons 22 mounted in the casing, the shanks of which extend through the casing and have their inner ends bearing frictionally upon a part of the rotary organization as the member 17, so that by pressing these buttons, frictional resistance is exerted to control the speed of revolution of the screw and the reciprocations of the needle.

For threading the appliance, the needle is provided with an elongated eye 23 in its side. As above stated, the needle is of tubular form, and its upper end being secured to the sleeve is not available for receiving the yarn, so that in order that the yarn may be inserted, the eye 23 is provided. The yarn may be directed through a tube or guide 24 on knurled sleeve 24*x* fixed on the exterior of the casing and extending longitudinally thereof, the lower end of this tube being adjacent an opening 25 in the side of the casing, which enable access to be had to the eye 23 of the needle so that the thread may be inserted through this eye, and thus direct it to the lower end of the needle so as to be operated upon by the beveled end thereof. In the operation of the apparatus, it is only necessary to hold the tool against the fabric with the presser foot bearing thereon. The reciprocation of the needle will carry the thread through the fabric, and the implement will feed itself along the fabric due to the action of the needle and the presser foot, the said presser foot riding over the last inserted stitch or loop and preventing it from being withdrawn from the fabric when the needle again enters the fabric. It will be noticed in this connection that the presser foot is directly adjacent the needle, and in fact is in contact therewith, in the form of the invention which I have chosen to disclose the principles thereof, and immediately upon insertion of the yarn and the retraction of the needle, the presser foot will engage this last inserted loop and hold it against being pulled out during the further operation of the implement.

As above stated, the tool will feed itself automatically along the cloth being embroidered, and in explanation of this action, it is believed that the rear inclined face of the needle plays an important part in connection with the juxtaposed presser foot. When the needle is in the act of penetrating the fabric, it is impelled in a forward direction, by reason of the inclined lower end thereof riding against the fabric, and thus the fabric is pushed in a forward direction on the advance side of the needle. When the needle retracts, the recovery of the fabric, which has been distorted or pushed in a forward direction, will cause it to assume a position beneath the extreme forward point of the needle, so that when the needle is again advanced, the point of the needle will penetrate the fabric in advance of the point on said fabric where the previous penetration occurred. Contributing to this action is the juxtaposed presser foot, which is inclined on its rear face, and presents its lower pointed end against the fabric directly adjacent the rear face of the needle on which it bears. The fabric furnishes an abutment against which the pressure will be exerted by the inclined face of the presser foot, resulting in a forward movement of said presser foot, with the implement so that the needle will penetrate at a point in advance of the point of previous penetration.

The use of the presser foot with its beveled face on its rear side may be said to contribute to the automatic traversing action of the implement over the cloth by reason of the tendency of the lower point of this presser foot to penetrate the fabric as the needle is retracted.

Reverting to details of the mechanism, I show a spring at *a* for pressing the member 18 of the friction clutch downwardly against the member 17. This spring bears on a collar *b* which bears on balls *c* between itself and the member 18 so that the clutch members are held in contact with a yielding pressure.

The buttons 22 are associated with a leaf spring 22*a* which normally presses them outwardly.

As a modification of the above described apparatus, I may employ a pair of needles 1*a*, 1*b*, Figure 6, arranged side by side, and connected to the sleeve, but in this case the sleeve will be split into two parts 11*c*, 11*d*, one for each of the needles. The pins connecting these sleeve sections with the screw as shown at 11*x* will be so located in relation to the double screw that when one sleeve is all the way down, the other sleeve section will be all the way up. The needles, therefore, will penetrate the cloth alternately, and the tool will advance by a step by step action, each needle when located in the cloth serving as a pivot about which the tool will swing in carrying the other needle to an advanced position for newly penetrating the fabric. The tool, under this modification, will step itself along, swinging first in one direction about one needle and then in the other direction about the other needle, according to which of said needles is in its advanced position penerating the fabric.

Another form of the invention is shown in Figures 9 and 10 in which the needle is mounted in a member 26 together with the presser foot, these parts being located at a point off center from the vertical axis of the head 26 about which it turns. This head is swiveled at 27 within the casing so as to turn readily about the longitudinal axis of the tool, and connection with the double screw is afforded in any suitable way so that the needle will be reciprocated as above described in relation to its presser foot, and by reason of the eccentric relation of the presser foot and needle to the longitudinal axis of the appliance, the appliance may be directed along lines other than straight so that script writing may be embroidered on the fabric or other designs involving curves may be made, in all of which operations the needle and its presser foot will trail in relation to the longitudinal axis of the tool as this is advanced over the fabric.

In this form of the appliance the needle 1*d* has a head 28 at its upper end which is grooved at 29 in which a disc 30 engages. This disc is arranged centrally of the casing and it is carried by a rod 31 extending from the sleeve which is reciprocated by the double screw member to which it is attached by the pin or set screw 32. By this construction the needle, as it moves about the axis of the tool, will maintain its connection with the reciprocating sleeve by the grooved head 28 engaging and moving about the edge of the disc 30.

In Figures 11 and 12, I show at 33 a carrier in which the implement is mounted adjustably by a set screw 34. This carrier moves upon a track or guide rails 35, suitable rollers being provided for ease of movement. The track is suitably supported in fixed position over the fabric or in other words the fabric is placed in a fixed position relating to a fixed guide frame 35 for the carriage 33 to move along. The tool is set at an inclination to the fabric, and the pressure foot bears thereon at its lower point, the inclined rear face rising from this point of contact.

This tool will advance itself along the fabric automatically. The track is horizontal and is parallel with the fabric which may be held in any suitable frame.

The carrier may support a gang of tools, and the track upon which the carrier moves may be adjustable laterally so that, when one row or plurality of rows of tufts have been inserted into the fabric, the appliance may be shifted laterally over the adjacent part of the fabric for the tufting of this portion.

This adjustment may be effected by a suitable screw shaft 36.

I claim:

1. A turfing appliance comprising a tubular needle of cylindrical form beveled at its lower end upwardly and rearwardly and having its point in line with the straight front surface of said tubular needle, a presser foot in rear of the needle and juxtaposed to the rear surface of the needle to immediately overlie the last loop inserted as the appliance advances step by step over the surface of the cloth, the presser foot being maintained against the cloth during the reciprocations of the needle, and means for reciprocating the needle, said appliance advancing automatically along the fabric during and as a consequence of the operation of the needle, and means for directing the thread down through the interior of the needle.

2. A turfing appliance comprising a tubular needle through the interior of which the thread feeds, said tubular needle having its lower end face inclining upwardly and rearwardly, a presser foot in rear of and juxtaposed to the needle, means for reciprocating the needle, the presser foot being maintained against the cloth as the needle reciprocates, said appliance feeding itself along the surface of the cloth, substantially as described.

3. A turfing appliance in accordance with claim 2 in which the presser foot is inclined rearwardly and upwardly on its rear face, said inclined face extending from the point in juxtaposition to the rear face of the needle tube, substantially as described.

4. A turfing appliance according to claim 2 in which the presser foot is grooved on its front side to receive, guide, and sustain the needle laterally, substantially as described.

5. A turfing appliance comprising a tubular needle, a carrying member, a block at the lower end of said member having an opening in which the needle is guided, said block having a downward extension grooved on its front side for guiding the needle, said extension lying on the rear face of the tubular needle and terminating in a presser foot to rest on the cloth, and means for reciprocating the needle, substantially as described.

6. A turfing appliance comprising a substantially cylindrical elongated casing having a presser foot at its lower end to rest on the cloth, a tubular needle, and means within the tubular casing for reciprocating the needle, said means including a sleeve fitted to reciprocate within said casing, a double screw-threaded member fitted to the interior of the sleeve and receiving a stud from said sleeve by which said sleeve is operated, and means extending into the casing for rotating the double screw-threaded member, substantially as described.

7. A turfing appliance comprising a substantially cylindrical elongated casing having a presser foot at its lower end, a reciprocating needle, a sleeve to which the needle is attached, a double threaded screw within the sleeve for operating the same, a rotary shaft for operating the screw, a friction clutch within the casing operated by the shaft, and a thrust bearing within the casing for the screw, substantially as described.

8. An appliance of the class described comprising an elongated cylindrical member having a presser foot and a reciprocatory needle at its lower end, and driving mechanism for said needle to convert rotary into reciprocating movement, said driving mechanism being located within the elongated casing, which casing serves as a handle for the appliance, said appliance having a thread guide tube extending longitudinally of the handle member, said handle member having an opening through which the thread passes, and said needle having a lateral opening to receive the thread, said needle being of tubular form and through which the thread passes to the point thereof, substantially as described.

9. A turfing appliance comprising a pair of reciprocating needles arranged side by side, a frame member, and means for operating the reciprocating needles alternately, whereby when one needle is retracting, the other needle is advancing, each of said needles being in the form of a tube for guiding the thread to the point of the needle, substantially as described.

10. A turfing appliance according to claim 9 including presser foot means juxtaposed to the needles, said appliance having an automatic feeding action along the surface of the cloth being turfed, the appliance oscillating about the needles alternately during the forward feeding movement of the appliance along the cloth, substantially as described.

11. In combination in a turfing appliance, a pair of needles arranged on opposite sides of the longitudinal axis of the appliance, a frame member, a double screw within the frame member, and a split sleeve, one member of which is attached to one of the needles and the other member of which is attached to the other needle, with a connection between said sleeve sections and the double screw for operating said sections in opposite directions relative to each other, the said double screw being arranged coaxially with an axial line midway between the two needles, substantially as described.

12. In combination, a pair of tubular needles each adapted to carry thread, a carrying member, means within the carrying member for operating the needles in opposite directions relative to each other, and presser foot means juxtaposed to the needles, substantially as described.

13. In combination in a turfing appliance, a frame or carrying member, an oscillating block or head mounted in said carrying member, a needle and presser foot carried by said oscillating block, said parts being located to one side of the center of oscillation of said block, and means for reciprocating the needle, said oscillating block turning automatically as the direction of movement of the instrument is changed, thereby causing the needle to assume a trailing position in respect to the direction of movement, substantially as described.

14. In combination in a turfing appliance, a tubular needle through which the thread passes to the delivery point, a presser foot juxtaposed to said needle, said needle occupying a fixed position laterally in respect to the juxtaposed presser foot, which latter is adapted to bear upon the last inserted tuft to prevent its withdrawal, a carrying member for said presser foot and needle, means for reciprocating the needle, the presser foot being maintained in engagement with the cloth while allowing the appliance freedom to traverse said cloth automatically, said presser foot having its lower end in rear of the needle terminating in a point having a tendency to indent the fabric, the said appliance feeding forward automatically along the cloth during and as a consequence of the operation of the needle, substantially as described.

15. In apparatus of the class described, a reciprocating hollow needle, a presser foot in rear of and contacting with the needle, both the needle and presser foot being beveled upwardly and rearwardly, and means for reciprocating the needle relative to the presser foot.

16. Apparatus according to claim 15 having a guide way and a carrier for the needle and presser foot movable along said guide way.

17. A turfing appliance according to claim 2 in which the presser foot guides the needle and sustains it against lateral displacement.

18. In apparatus of the class described, a reciprocating hollow needle, a presser foot in rear of and adjacent the needle, both the needle and presser foot being beveled upwardly and rearwardly, and means for reciprocating the needle relative to the presser foot.

19. Apparatus of the class described, a reciprocating hollow needle having its lower end face inclined upwardly and rearwardly, a presser foot in rear of and in fixed relation adjacent the needle and of such limited extent from front to rear that it will overlie only the last inserted loop, and means for reciprocating the needle while the presser foot is maintained in contact with said last inserted loop, substantially as described.

20. In combination, a reciprocable hollow needle having its lower end inclined upwardly and rearwardly, a presser foot adjacent the rear side of said needle, having its lower face inclining upwardly and rearwardly, means for reciprocating the needle, a support for said parts, and means for holding and guiding the support over the surface of the fabric to be tufted, said holding and guiding means maintaining the support with the presser foot pressed against the fabric while the needle is reciprocated.

21. In an appliance of the class described, a tubular support, a needle, and a presser foot, a rotary shaft extending into the tubular support, a double screw-threaded member mounted coaxially with said support and within the same and connected with the rotary shaft, and a member reciprocated lengthwise of the tubular support by said double screw-threaded member and connected with the needle for operating the same.

22. A power-driven turfing appliance comprising a tubular needle of cylindrical form beveled at its lower end upwardly and rearwardly and having its point in line with the straight front surface of said tubular needle, a presser foot juxtaposed to the rear surface of the needle to immediately overlie the last loop inserted as the appliance advances step by step over the surface of the cloth, the presser foot being maintained against the cloth during the reciprocations of the needle, and means for reciprocating the needle, said appliance advancing automatically along the fabric during and as a consequence of the operation of the needle, and means for directing the thread down through the interior of the needle.

23. A power-driven turfing appliance comprising a tubular needle through the interior of which the thread feeds, said tubular needle having its lower end face inclining upwardly and rearwardly, a presser foot juxaposed to the needle, means for reciprocating the needle, the presser foot being maintained against the cloth as the needle reciprocates, said appliance feeding itself along the surface of the cloth, substantially as described.

24. A power-driven turfing appliance according to claim 23 in which the presser foot guides the needle and sustains it against lateral displacement.

25. An appliance of the class described comprising a casing having a presser foot and a reciprocatory needle at its lower end, and driving mechanism for said needle to convert rotary into reciprocatory movement, said driving mechanism being located within the casing, which casing serves as a handle for the appliance, said appliance having thread guiding means extending exteriorly of the casing, said casing having an opening through which the thread passes and said needle having a lateral opening to receive the thread, said needle being of tubular form and through which the thread passes to the point thereof, substantially as described.

26. An appliance of the class described comprising a casing having upper and lower portions, a fixed presser foot at the base of the lower portion, a needle adapted to be reciprocated through and guided by the presser foot, a reciprocating head in said casing carrying said needle, and means within the upper portion of the casing for reciprocating the head.

27. A power-driven turfing appliance comprising a casing, means interiorly of said casing for converting rotary into reciprocating motion, a hollow needle actuated by said means and mounted for reciprocation in the lower portion of said casing, a member embracing a presser foot affixed to the lower end of the casing said member surrounding and guiding said needle, and slots in said casing and needle for the passage of a thread from a point exteriorly of said casing to and longitudinally through said hollow needle, said presser foot extending rearwardly of the needle and having a bearing surface on the fabric adequate to lock the last inserted loop.

WILLIAM D. VAN DYKE.